Patented Apr. 3, 1923.

1,450,712

UNITED STATES PATENT OFFICE.

WALTER H. CADY, OF BOSTON, MASSACHUSETTS.

PROCESS OF MAKING PREPARED ROOFING.

No Drawing.   Application filed November 7, 1921. Serial No. 513,334.

*To all whom it may concern:*

Be it known that I, WALTER H. CADY, a citizen of the United States, residing in the city of Boston, county of Suffolk, and State of Massachusetts, have invented certain new and useful Improvements in Processes of Making Prepared Roofing, of which the following is a specification.

This invention relates to roofing product and process of making same and refers more particularly to a process in which the waterproof felted substance used as the foundation of the prepared roofing sheet has imposed thereon a granular material mixed with a color substance to give it an attractive appearance when laid upon a roof.

The roofing sheet consists of a felted or fibrous substance which has preferably impregnated therein a waterproofing substance in a dispersed condition and coalesced in the body of the sheet to produce a unitary combination. The prepared roofing sheet to be treated with the granular substance may be saturated with an adhesive substance or have incorporated in the body thereof the bituminous substance finely dispersed through the body of the sheet and coalesced upon the fibres thereof during the felting of the sheet. Upon this sheet, which may or may not have an adhesive coating of waterproofing substance, there is imposed a granular material mixed with a colored adhesive substance, the latter preferably consisting of wax tailings, stearine pitch or other hydrocarbon substance capable of being colored. This material mixed with the granular substance, is spread upon the sheet in a sheet so that it completely covers the sheet and is rolled into the upper surface of the sheet by pressure rolls.

Heretofore, it has been difficult to spread granular substance and adhesive binder upon the surface of the sheet due to the fact that the waterproofing substance or binder material is so adhesive that it cannot easily be forced through tubes or pipes or distributed properly upon the roofing sheet. In the process herein described, the binder, which consists of wax tailings, stearine pitch or other binder material capable of being colored, is emulsified with clay and water to form a non-adhesive emulsion with the adhesive or binder substance forming the internal phase of the emulsion. This non-adhesive substance is mixed with the granular material and may be thinned with water to a desired consistency so that it may be easily forced through distributing pipes and laid in a thin layer upon the surface of the sheet. The roofing sheet as described, may consist of a saturated felted sheet common to the prepared roofing industry or consist of a sheet produced in the following manner.

As an alternative to the usual saturated felt used as a base in the prepared roofing art, the stock to be felted which may consist of the usual combinations of rag, paper or other material which is standard stock for prepared roofing, has mixed therewith an adhesive bituminous waterproofing substance in emulsion form. This emulsion consists of predetermined amounts of bituminous material, clay and water thoroughly mixed to form a non-adhesive emulsion, the adhesive bituminous material mixed with the clay and water while in a liquid form and forming the dispersed or internal phase of the emulsion. This non-adhesive emulsion is then mixed with the felted stock after which the combination is passed over a felting or paper machine which produces the foundation for the prepared roofing sheet. The sheet so formed has the bituminous material thoroughly incorporated in the body of the sheet, the bituminous material becoming adhesive with the drying out of the water which forms enveloping films about the finely dispersed particles of the adhesive bituminous substance and coalescing or attaching itself with the separate fibres to produce a uniformly impregnated waterproof sheet. This sheet may or may not be then coated with an adhesive coating and subsequent thereto, the mixture of colored emulsion and granular material imposed or distributed upon the surface of the sheet. In case the sheet is not coated with an adhesive substance prior to the distribution of the mixture of emulsion and granular material thereon, the mixture must be made of such a consistency that the distribution may be made even and the water in the emulsion will readily evaporate so that the sheet will be uniformly covered with the colored emulsion and granular surfacing. If the sheet is coated with an adhesive substance prior to the surfacing with the mixture, the granular substance will more readily adhere to the surface of the sheet and the consistency of the mixture will be of less importance. In either case, the sheet to be surfaced is passed beneath the distributing pipes and the mixture of granular material with the colored binder is distributed in an even uniform layer upon the surface of the sheet and is thereafter immediately rolled into the surface of the sheet by pressure rolls, thus forming a uniform attractive roofing product.

Instead of applying the emulsion in the form of a continuous sheet or covering over the surface of the roofing felt or roofing stock, the emulsion may be applied to the surface in strips so that it gives the stock a banded design which, when cut into shingle strips and laid upon a roof simulates shingles in appearance. In putting the emulsion onto the surfacing of the roofing sheet in this banded design, it is necessary to have separate spouts distributed across the surface of the roofing sheet so that the emulsion will be fed in bands or ribbons to the surface as the sheet moves forward in its travel through the machine. To assure a proper feed, it may be necessary to have a forced pressure behind the emulsion so that the bands will be of uniform thickness and the stock evenly distributed.

In addition to the applying of a single colored emulsion upon the surface of the sheet either in a continuous layer or in the form of a design there may be placed upon the sheet surface different colored emulsions producing stripes or designs of any desired sort of varied colors to produce different effects when laid upon the roof. The varied colors may be due to the coloring matter incorporated in the emulsion or to the different colored slate or grit surfacings used in connection with the emulsions.

I claim as my invention:

1. A process for producing prepared roofing, consisting in surfacing a prepared roofing sheet with a granular substance and with an adhesive binder in the form of a non-adhesive emulsion.

2. A process for producing prepared roofing, consisting in surfacing a prepared roofing sheet with a granular substance and with a colored adhesive binder in the form of a non-adhesive emulsion.

3. A process of producing a prepared roofing consisting in distributing onto the surface of the roofing a mixture of granular substance and an adhesive binder in the form of a non-adhesive emulsion.

4. A process of producing a prepared roofing consisting in coating the roofing sheet with an adhesive binder and distributing upon the coated surface a mixture of granular surfacing and adhesive binder in the form of a non-adhesive emulsion.

5. A process for producing a prepared waterproof sheet consisting in surfacing the prepared sheet with a granular substance and with a waterproof pitchy binder in the form of an emulsion.

6. A process for producing a prepared waterproof sheet consisting in surfacing said sheet with a granular substance and with a waterproof colored pitchy binder in the form of an emulsion.

WALTER H. CADY.